Aug. 26, 1941.  A. LANGSNER  2,253,569
BEARING
Filed Jan. 10, 1940
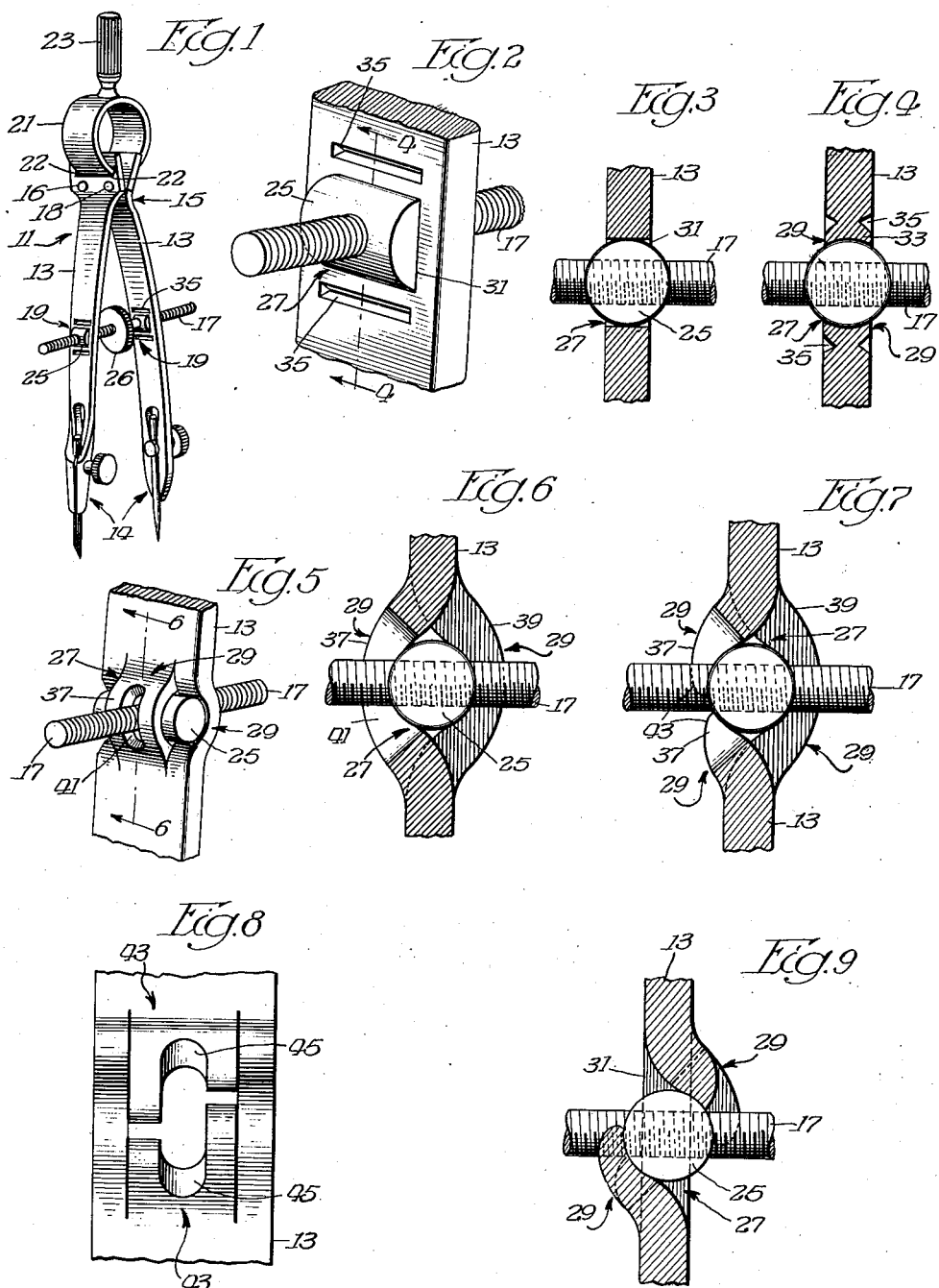
Inventor
Adolph Langsner
By:— Junius F. Cook, Jr.
Atty.

Patented Aug. 26, 1941

2,253,569

UNITED STATES PATENT OFFICE 2,253,569

BEARING

Adolph Langsner, Chicago, Ill., assignor to Eugene Dietzgen Co., Chicago, Ill., a corporation of Delaware Application January 10, 1940, Serial No. 313,165

10 Claims. (Cl. 33—154)

My invention relates in general to bearing structures and has more particular reference to a pivot particularly well adapted for use in drafting instruments for pivotally mounting an adjusting screw of the character commonly used in controlling the spacement of the legs of instruments such as bow compasses and dividers.

An important object is to provide an improved bearing structure of the character mentioned that is inexpensive through simplicity of construction, whereby assembly of the constituent parts of the bearing is greatly facilitated; a further object being to provide an inexpensive bearing structure of adequate strength and durability for service as an adjusting screw mounting; a further object being to provide an improved mounting for the leg adjusting screw of bow compasses and dividers.

Another important object resides in providing a mounting for a pivot by pressing the material of the mounting in opposite directions to form a journal for the pivot; a further object being to form a pivot opening in a supporting member and to secure the pivot in place by deforming the material of the mounting member to provide a pivot retaining journal.

Another important object is to provide a journal for a pivot, carrying a member extending diametrally of the pivot, by forming the pivot mounting member with an opening or seat for the pivot, and through which opening the diametrally arranged member also extends, and by forming the mounting member to provide a seat for said pivot and utilizing formed portions of said member to retain the pivot in its seat; a further object being to form the pivot seat in a mounting member comprising a relatively thin strip, having thickness not substantially greater than the diameter of the mounted pivot; a still further object being to form the pivot seat by offsetting portions of the mounting strip oppositely from the normal plane thereof.

These and numerous other important objects, advantages, and inherent functions of the invention will become apparent as the same is more fully understood from the following description, which, taken in connection with the accompanying drawing, discloses preferred embodiments of the invention.

Referring to the drawing:

Figure 1 is a perspective view of a bow type instrument fitted with a pivot, embodying my present invention;

Figure 2 is an enlarged perspective view of the pivot shown in Figure 1;

Figures 3 and 4, respectively, are sectional views taken substantially along the line 4—4 in Figure 2, and showing the pivot in a preliminary stage of construction and in finished condition;

Figure 5 is a perspective view of an alternate pivot construction embodying my present invention;

Figure 6 is a sectional view taken substantially along the line 6—6 in Figure 5;

Figure 7 is a sectional view similar to Figure 6, showing a modified pivot construction;

Figure 8 is a plan view of a blank from which the pivot shown in Figure 7 may be made; and Figure 9 is a sectional view of a modified form of pivot.

To illustrate the invention, I have shown on the drawing a bow-type drafting instrument 11, comprising a pair of legs 13 connected together for relative tilting movement, as by means of the rocking connection 15, whereby the remote working ends 14 of the arms 13 may be adjustably separated by means of the threaded member 17, having pivotal and threaded connection with the arms 13 by means of pivots 19 embodying my present invention. It will be obvious that the invention is not necessarily restricted to bow-type instruments, but, since pivots embodying my present invention may be applied advantageously in drafting instruments, I have chosen, for the sake of demonstrating the invention, to illustrate pivots embodying the same, as applied in the arms 13, to serve as a mounting for the adjusting screw 17.

While the invention is not necessarily restricted in its application to drafting instruments of the bow type, I have shown an instrument in which the arms 13 are rockably connected by means of the joint 15, which comprises a pair of bearing portions on the arms 13 and forming rockable engagement between the arms and the upper ends thereof, each arm having a dimple 16 and a socket 18 therein, respectively, for reception in a corresponding socket and dimple formed on the other arm, said interengaging sockets and dimples serving to hold the arms against relative displacement, except about the rocking axis of the joint. Above the interengaging sockets and dimples forming the joint 15, each arm is provided with a groove 22 to receive the opposed ends of a band spring 21, which serves to urge the arms 13 about the rocking pivot 15 in a direction normally to separate the remote working ends 14 of said arms. The spring 21, at its medial portions, may carry a handle 23 to aid in the manipulation of the instrument.

The adjusting screw 17 is provided, at its medial portion, with a disk 26, the peripheral portions of which are preferably knurled to facilitate manipulation of the disk for turning the threaded stem 17, said stem, on opposite sides of the disk 25, being oppositely threaded, and said oppositely threaded portions having threaded engagement with the arms 13 at the joint 19, so that the spacement of the working ends 14 may be adjusted by turning the disk 25 in one direction to open said ends 14 and in the opposite direction to draw said ends together against the opening urge of the spring 21.

It will be seen that the arms comprise relatively wide strips and that the pivots 19 each comprise a cylindrical member 25 extending in a seat 27 formed in the strip material comprising the arm 13. The threaded member 17 extends through and is threaded in a diametral opening through the pivot member 25. The cylindrical pivot member 25 is retained in the seat by deformed portions 29 of the strip material.

As shown in Figures 1, 2 and 3, the pivot seat 27 comprises a rectangular opening 31 formed in the arm 13, as by a simple punch-out operation which results in a cavity, as shown in Figure 2, into which the pivot member 25 may be assembled, after which the material of the arm strip 13 may be deformed, as by a simple swaging operation, in order to press the side edges of the opening 31 about the curves surfaces of the pivot member 35 to form the retaining means 29, said swaged portions being shown at 33, and the swage marks at 35, in Figure 3 of the drawing.

As shown in Figures 4-9, the pivot seat 27 and and retaining portions 29 may be formed by striking out portions of the arm strip from the plane of the arm in order thus to provide a socket for the rockable mounting of the pivot member 25, the struck-out portions being arranged not only to retain the pivot member 25 but to accommodate the threaded stem 17 in position extending through the arm and the pivot member 25.

To this end, as shown in Figures 4, 5 and 6, the medial portions 37 of the strip are pressed outwardly thereof in one direction, while the lateral portions 39 are pressed outwardly of the strip in the opposite direction in order to form a mounting space for the cylindrical pivot member 25 between the oppositely pressed portions 37 and 39, it being understood that the medial portions 37 engage the medial portions of the pivot 25 on one side thereof, while the portions 29 engage the ends of the member 25 on the opposite side. The portions 37 are formed with openings 41 formed centrally thereof for the accommodation of the threaded adjusting stem 17, and the projection of the stem 17 in this opening 41 serves to retain the member 25 against axial displacement from operating position in its seat.

The mounting, as shown in Figures 6 and 7, is substantially like the mounting illustrated in Figures 4 and 5, except that the medial pivot retaining portions 41 comprise a pair of co-operating tongues 43 instead of a continuous band, as shown in Figures 4 and 5. These tongues may be cut and formed in the manner illustrated in Figure 7, and each preferably has a medial notch 45 therein forming the stem receiving opening 37 in the finished joint.

The joint, as shown in Figure 8, may comprise a pivot receiving opening 31 formed by pressing the tongues 43 from the blank in opposite directions.

It will be noted that the pivot mounts illustrated in Figures 4, 5, 6 and 8 may be formed as the result of a single stamping operation, which may comprise a part of the operation of forming the entire leg 13 of the instrument. Consequently, the cost of making the mounting is negligible, and the assembly of the parts consists merely in mounting the preformed pivot member 25 and threading the stem 17 in place. The pivot construction, however, is adequately strong and will continue to function in adequate fashion during extended periods without attention.

The pivot construction of my present invention, in fact, is capable of outlasting the instrument itself, due to the rugged character of the pivot structure, and thus eliminates one of the chief difficulties ordinarily encountered in drafting instruments of the sort herein disclosed.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A bearing comprising a mounting formed with an opening providing a seat having spaced-apart facing end surfaces, a cylindrical pivot member in said opening with the ends of the pivot member abutting said end surfaces, and means for retaining the pivot member in said opening, said means comprising lip portions formed on said mounting in position cooperatively engaging the cylindrical surfaces of said pivot member between the ends thereof.

2. A bearing comprising a strip of material formed with a rectangular opening, a cylindrical pivot member in said opening with the opposed ends of the pivot member abutting upon surfaces at the opposite ends of said opening, and means for retaining the pivot member in said opening, comprising deformed portions of said strip at the sides of said opening facing the cylindrical surfaces of said pivot member.

3. A bearing comprising a strip of material formed with a rectangular opening, a cylindrical pivot member in said opening with the opposed ends of the pivot member abutting upon surfaces at the opposite ends of said opening, the material of said strip being swaged adjacent the edges of said opening which abut the cylindrical surfaces of the pivot member to provide means retaining the pivot member in place in said opening.

4. A bearing comprising a strip of material formed with a rectangular opening, a cylindrical pivot member in said opening with the opposed ends of the pivot member abutting upon surfaces at the opposite ends of said opening, said opening being formed by striking lip portions from said strip, and said lip portions being positioned to engage the cylindrical surfaces of said pivot member on opposite sides of the strip to retain the pivot member in place in said opening.

5. A bearing comprising a strip of material formed with an opening providing a pivot mount, said mount being formed by pressing portions of the strip therefrom in opposite directions to provide oppositely extending portions, and a cylindrical pivot member held in said opening by said oppositely extending portions.

6. A bearing comprising a strip of material formed with an opening providing a seat having spaced-apart facing end surfaces, said seat being formed by pressing portions of the strip outwardly thereof on opposite sides of the strip, and a cylindrical pivot member held in said opening by said outwardly pressed portions with the ends of the pivot member abutting said end surfaces.

7. A bearing comprising a strip of material formed with an opening providing a seat having spaced-apart facing end surfaces, said seat being formed by pressing portions of the strip outwardly thereof on opposite sides of the strip, and a cylindrical pivot member held in said opening by said outwardly pressed portions, with the ends of the pivot member abutting said end surfaces, parts of said outwardly pressed portions being cut away to accommodate a stem diametrally mounted in and extending through said pivot member.

8. A bearing comprising a strip of material formed with an opening providing a pivot mount, said mount being formed by pressing portions of the strip therefrom in opposite directions to provide oppositely extending portions, and a cylindrical pivot member held in said opening by said oppositely extending portions, at least one of said portions being cut away to accommodate a stem diametrally mounted in and extending through said pivot member.

9. A bearing comprising a strip of material formed with an opening providing a pivot mount, said mount being formed by pressing medial portions of the strip therefrom to define the opening between said medial portions and the remaining strip portions on opposite sides of said medial portions, and a cylindrical pivot member held in said opening by and between said medial and remaining portions of the strip.

10. A bearing comprising a strip of material formed with an opening providing a pivot mount, said mount being formed by pressing a central portion of the strip therefrom outwardly in one direction and by pressing adjacent strip portions on opposite sides of said central portion outwardly of the strip in an opposite direction to provide oppositely extending portions, and a cylindrical pivot member held in said opening by said oppositely extending portions.

ADOLPH LANGSNER.